Patented June 16, 1942

2,286,725

UNITED STATES PATENT OFFICE 2,286,725

PURIFICATION OF SULPHONIC ACID PRODUCTS

Paul M. Goodloe, 2nd, Woodbury, N. J., assignor to Socony-Vacuum Oil Company, Incorporated, New York, N. Y., a corporation of New York No Drawing. Application October 21, 1938, Serial No. 236,246

3 Claims. (Cl. 260—504)

This invention relates to a process for the separation and purification of sulphonic acid products and more particularly to the purification of oil-soluble sulphonic acid products, such as the so-called "brown" or "mahogany" acids obtained from petroleum oil or other mineral oil.

When petroleum fractions are treated with sulphuric acid, especially with strong acid or oleum, mineral oil sulphonic acid compounds are formed. These mineral oil sulphonic acid compounds are of two distinct types, one of which is characterized by its oil solubility and the other is characterized by its water solubility.

In the usual practice for the preparation of these sulphonic acid bodies, the oil is treated with strong sulphuric acid or oleum either for refinement of the oil or specifically for production of sulphonic bodies. The treatment may be carried out either in one stage or many stages, and the resulting sludge is separated from the oil. The oil which has been freed of sludge is then treated, either before or after neutralization, with water or an aqueous solution containing a water-soluble solvent such as alcohol or acetone in order to remove the sulphonic acid products remaining in the oil, and these products are recovered from the aqueous extract either by "salting out" or distilling off the aqueous solvent. The sulphonic acids thus recovered from the oil phase are commonly designated "mahogany" or "brown" acids because of their color and are usually characterized by their solubility in oil which is much better than their solubility in water. For convenience, this class of sulphonic acid products will be referred to hereinafter as mahogany sulphonic acids.

The sludge separated from the above operation, with or without neutralization, yields sulphonic acids of a different kind upon digestion with water. Because of their color, these acids are known as "green" acids and generally exhibit the property of relatively low solubility in oil compared to the mahogany acids and better solubility in water.

It is well known that crude sulphonic acid products obtained, for instance, as outlined above contain a considerable amount of impurities in varying amounts, such as mineral oil, sulphuric acid, other inorganic matter, etc. Various refinement processes tending to produce sulphonic acid products freer of impurities have been proposed. However, so far as is known, none of the previous work on the purification of sulphonic acid products has touched upon the novel process of my invention.

Most of the procedures now practiced for the purification of mahogany sulphonic acid products are based upon the selective flocculation of the sulphonates or the corresponding acids from a comparatively dilute solution of the crude material by the addition to the solution of certain reagents. For instance, Wolff, U. S. Patent No. 1,240,523 adds 50% sulphuric acid to the solution of crude sulphonates thereby causing the freed sulphonic acids to separate out as a flocculation precipitate and the water solution of inorganic matter is decanted. A well-known procedure in the prior art for causing the flocculation of the sulphonates from aqueous media has been the saturation of the solution with common salt. Such a process leaves considerable salt in the sulphonates so obtained which must be removed for many purposes.

It is an object of this invention to provide an efficient process for the purification of mahogany sulphonic acid products from crude material in which they are contained. Another object of the invention is to provide an economical process for the purification of mahogany sulphonic acid products which yield a highly refined product suitable for service in any of the uses to which mahogany acid products are put. Still another object is to provide a process for obtaining purified mahogany acids of controllably different degrees of solubility in water and oil from the same crude material. These and many other objects will appear from the following description of my invention.

The invention is based upon the discovery that crude sulphonic acid products from any source containing mahogany sulphonic acid products along with various impurities, such as mineral oil, sulphuric acid and other inorganic matter, may be treated to obtain highly purified mahogany sulphonic acid products by first preparing an essentially aqueous solution containing the crude product and, after removal of oil, if desired, subjecting the resultant aqueous solution containing the crude product to a solvent extraction process which extracts the mahogany sulphonic acid products free of impurities.

The present process is to be clearly distinguished from processes for extracting sulphonic acids or sulphonates directly from a crude product by means of a solvent, since in such processes impurities are carried along with the sulphonates into the extract. These procedures are decidedly different from my process for extracting sulphonic acids or sulphonates from an aqueous solution, whereby the impurities remain in the aqueous solution.

The aqueous solution in which the crude sulphonic acid product is dissolved may comprise, for instance, either (1) an essentially pure water solution, or (2) an aqueous solution containing an organic water-soluble emulsion-breaking agent, or (3) an aqueous solution containing a strong electrolyte, or (4) an aqueous solution containing both an organic water-soluble emulsion-breaking agent and a strong electrolyte.

If an essentially pure water solution is used, the extraction solvent must not only be slightly soluble in pure water but must also possess emulsion breaking properties. On the other hand, the extraction of pure sulphonic acids or sulphonates from an aqueous solution with organic solvents which in themselves have little or no capacity for breaking oil-water emulsions is not practical because these organic solvents are emulsified with the water by the sulphonates present. If, however, a third agent capable of breaking emulsions is added in a proportion of about 1 to 50%, usually about 5 to 10%, the use of such organic solvents becomes feasible. Typical water-soluble organic emulsion-breaking agents which may be added to the water are methyl alcohol, ethyl alcohol, isopropyl alcohol, propyl alcohol, acetone, methyl ethyl ketone, propionic acid and methyl acetate. These emulsion-breaking agents, moreover, facilitate dissolution of the crude sulphonic product in the water, but amounts over about 50% should not be added as the solubility of the organic extraction solvent is then increased to an undesirable amount. Since a great many of the extraction solvents possess at least a slight tendency to form emulsions, it is usually preferable or necessary to extract from an aqueous solution containing an emulsion-breaking agent, as, for instance, one of those above mentioned. The formation of emulsions may also be lessened by the presence of certain polar compounds, for example, inorganic salts, acids and alkalis, which are strongly polar. Furthermore, the use of these strong electrolytes decreases the solubility of the sulphonic acids in the water phase producing the commonly used "salting-out" effect and therefore aids in obtaining a better separation or extraction. Moreover, when large quantities of salt or other electrolyte are added, other solvent extraction agents may be used. The reason for this is because there are certain water-soluble compounds, otherwise suitable as solvent extraction agents, which are only slightly soluble in a strong brine or other electrolyte solution and therefore will serve for extracting from these latter solutions.

Like many other solvent extraction processes as, for example, that used in petroleum refining, there are numerous organic compounds of widely different classifications which will serve as suitable solvent extractants in the present process. In general, alcohols containing 4 to 7 carbon atoms, certain ketones, aldehydes, organic acids and esters, also containing 4 to 7 carbon atoms are operable. Moreover, various aromatic hydrocarbons, chlorinated hydrocarbons, etc., are operable. By way of example, the following specific compounds which are suitable extraction solvents for my process might be mentioned: benzene, toluene, xylene, nitrobenzene, "Chlorex" (beta beta dichloro diethyl ether), ethylene dichloride, dipentene or turpentine, diethyl carbonate, butyl alcohols (tertiary must be used with electrolyte solutions), amyl alcohols, benzyl alcohol, ethyl acetate, amyl acetate, diethyl ether, methyl n-butyl ketone, butyraldehyde, and isovaleric acid. It is to be noted that compounds such as butyl, amyl, and benzyl alcohols, ethyl and amyl acetate, methyl m-butyl ketone, butyraldehyde, and isovaleric acid possess emulsion-breaking properties and may be used to extract from even a relatively pure water solution. Further, when large quantities of electrolytes such as salt are added to the water solution, for instance, up to saturation, not only may the above relatively water-insoluble compounds be used, but other organic solvents which are water-soluble but only slightly soluble in strong electrolyte solutions may be used. Typical specific examples of these latter compounds are isopropyl alcohol, methyl acetate, methyl ethyl ketone, and butyl cellosolve. It is obvious, therefore, that in this process as in other extraction processes, the number and diversity of solvents that may be used defies any definite chemical classification. Such a classification, however, is believed unnecessary as it is felt the teaching that the solvents are organic liquids having a relatively high solubility for mahogany sulphonic acid products and only a slight solubility in the particular aqueous solution from which the mahogany acids are to be extracted sufficiently defines the solvents that they may be readily determined. In selecting solvent extracting agents, it is desirable to choose compounds which possess boiling points sufficiently low that they may be separated from the sulphonic acids or sulphonates by distillation at ordinary pressures without danger of decomposing the sulphonic acids or sulphonates. Distillation under subatmospheric pressures may be used, if desired.

In carrying out my process, crude sulphonates or sulphonic acids comprising mahogany sulphonic acid products along with impurities are first dissolved in a suitable aqueous solution. This aqueous solution containing the crude product is then preferably, but not necessarily, made distinctly acid with a mineral acid, if not already so, in order to convert sulphonates to sulphonic acids. After the aqueous solution containing the crude sulphonic acid products is prepared, the first step of the purification process comprises removal of oil. While oil is usually present as an impurity, it is obvious that if the crude product being treated does not contain oil or if the use to which the purified sulphonic acid product is to be put does not require the absence of oil, this oil removal step may be omitted.

Removal of oil may be accomplished in the main by allowing the solution to stand, whereby the oil separates from the solution and is removed by suitable means, such as decantation. The aqueous solution may then be completely freed of mineral oil by washing, for example, with a light petroleum naphtha. The resulting oil-free aqueous solution is then ready to be treated in order to obtain the brown sulphonic acid products free from other impurities, such as sulphuric acid, other inorganic matter, etc., which are dissolved in the aqueous solution. This step of the purification process is accomplished by solvent extraction.

Accordingly, the oil-free aqueous solution is treated with a suitable volume of an extraction solvent which is relatively insoluble in the aqueous solution and which has a substantial solubility for mahogany sulphonic acids. The amount of the extraction solvent added, as for example benzene, is usually about one-fifth to one-half the volume of the aqueous solution. After being agitated and allowed to stand, separation into two layers is immediate, the benzene or other extraction solvent carrying the mahogany sulphonic acid products to one layer and the other layer comprising aqueous solution retains the dissolved inorganic matter, mineral acids, and other impurities. The extraction solvent layer is then removed and the sulphonic acids therein neutralized with caustic. After filtration and distillation of the solvent which may then be reused, the sulphonates are obtained in a pure condition.

Moreover, by the present invention comparatively pure sulphonates may be easily and cheaply produced from the crude emulsion of oil, water, and sulphonates obtained as a by-product in the acid refining of petroleum distillates to produce turbine oils. For instance, when tertiary amyl alcohol (20% by volume) is added to such a crude emulsion of oil, water, and sulphonates, and the whole mixed and allowed to stand, there are formed three layers, viz., oil on top, water on the bottom, and a solution of sulphonates in amyl alcohol in between. This sulphonate layer may be separated and the solvent recovered by distillation.

The purified mahogany sulphonic acid products prepared in accordance with my process have been found to be highly suitable for the preparation of soluble oils for use in the textile industry and as cutting oils. Moreover, these purified products may be used with advantage in any of the many applications to which such products are now put.

If the nature of the sulphonic acids render it desirable, the aqueous solution may be neutralized or made alkaline before the extraction. Regardless of whether the aqueous solution of crude product is acid, neutral or alkaline, varying amounts of salt or other electrolyte may be added before or coincident with the extraction.

An important feature of my invention is the discovery that by the present process purified mahogany acids of controllably different degrees of solubility in water and oil may be produced from the same crude material dependent upon the pH of the solution being extracted and the presence or absence of electrolytes. Thus, from a given crude mixture of mahogany sulphonates or sulphonic acids a product is obtained which shows a fairly high degree of water solubility when the extraction from aqueous solution (with benzene for instance) is carried out (1) in the acid state in the presence of large amounts (up to saturation) of salt or mineral acid. If the extraction is carried out (2) in the acid state in the absence of added salt or other electrolyte, the product is slightly less soluble in water. If the aqueous solution (3) is neutralized or made alkaline and an electrolyte added, the extraction produces a product of a still different grade, characterized by being less soluble in water and more soluble in mineral oil then either of the products mentioned just above. When the sulphonates are extracted from a neutral medium (4) in the absence of added electrolytes, the product exhibits a relatively low solubility in water and correspondingly higher solubility in oil than any of the other products mentioned above. Accordingly, it may be seen that the water solubility of the mahogany acids is increased and the oil solubility decreased in direct proportion to the decrease in pH value of the aqueous solution from which they are extracted or in direct proportion to the decrease in pH value and the addition of suitable electrolytes.

Although the process is particularly directed to the purification of mahogany petroleum sulphonic acids, it is to be clearly understood that my invention contemplates, and is applicable to, the treatment for purification of any crude sulphonic acid products obtained from mineral oils in general and the like, as for instance, the sulphonation product of alkylated naphthalenes or benzene.

The invention will be further illustrated by the following specific examples. However, it is to be understood that the invention is not to be restricted thereby, since there may be wide variations without departing from the spirit of the invention.

*Example I*

A crude sulphonic acid product is obtained by washing a sour acid treated mineral stock with dilute caustic soda and the resulting concentrated solution of oil and sodium sulphonates and inorganic impurities is then diluted with one-half its volume of alcohol (95%), acidified with sulphuric acid (98%) and allowed to settle. After separating from the oil, the alcoholic solution is extracted one or more times with one-fourth volume of light naphtha each time, to remove the final traces of oil. The oil-free alcoholic solution is then extracted with one-fourth volume of benzene and the aqueous alcoholic layer drawn off and retained for alcohol recovery. The benzene solution of sulphonic acids is neutralized with 42° Bé. sodium hydroxide and filtered. The resulting filtrate is then distilled on a water bath, yielding a product containing about 33% water which, when dehydrated is an amber solid that may be easily crushed between the fingers to dry powder. The dehydrated product analyzes:

| | Per cent |
|---|---|
| Acidity (as oleic acid) | 0.46 |
| Ash | 7.3 |
| Combined SO$_3$ (Hart's method) | 5.9 |

*Example II*

For comparison, some of the solution of oil and sodium sulphonates obtained from the acid stock in the same manner as outlined in Example I is finished by the conventional salting out process. After as much oil as would separate has been removed, the solution is saturated with common salt which causes the flocculation of the remaining oil and the sulphonates. This semi-solid material is separated, heated to 200° F. and allowed to settle. A further amount of the brine solution and some of the sulphonates are removed from the bottom and discarded to free the material as much as possible from the salt. The sulphonates are then heated at 300° F. until the water content has dropped to less than 5%. The product analyzes as follows:

| | Per cent |
|---|---|
| Water | 4.5 |
| Acidity | Trace |
| Ash | 6.5 |
| Mineral oil | 70.5 |
| Ash (anhydrous, oil-free material—calculated) | 26 |

While this latter material is satisfactory for use in cutting oils, it is not as active for this purpose as the material obtained by my benzene extraction process and it is not suitable at all for textile oils.

I claim:

1. The process of purifying a crude petroleum mahogany sulfonate product containing water-soluble impurities which comprises agitating said crude product with an alkaline aqueous medium containing sufficient salt to substantially saturate the water in said medium and an organic solvent having substantial solubility for said sulphonates and not more than slight solubility in a substantially saturated aqueous salt solution, permitting two phases to form comprising an aqueous salt phase containing said impurities and a solvent phase containing purified mahogany sulphonates, separating the solvent phase from the aqueous salt phase, and recovering the purified mahogany sulphonates from said solvent phase.

2. The process of purifying a crude petroleum mahogany sulphonate product containing oil and water soluble impurities which comprises washing an aqueous solution of the crude product with light petroleum naphtha to remove oil, converting the washed aqueous solution to a substantially saturated aqueous brine solution, extracting the oil-free brine solution while it is in an alkaline state with about 20 to 50% of an organic solvent having a substantial solubility for mahogany sulphonates and not more than slight solubility in said brine solution, whereby two phases are formed comprising an aqueous brine phase containing said water-soluble impurities and a solvent phase containing purified mahogany sulphonates, separating the solvent phase from the aqueous phase, and recovering the purified mahogany sulphonates from said solvent phase.

PAUL M. GOODLOE, 2ND.